April 7, 1953  H. N. HUSE  2,633,603
MOLD
Filed June 28, 1950  2 SHEETS—SHEET 1

INVENTOR.
HIRAM N. HUSE
BY James G. Bethell
ATTORNEY

April 7, 1953     H. N. HUSE     2,633,603
MOLD

Filed June 28, 1950     2 SHEETS—SHEET 2

INVENTOR.
HIRAM N. HUSE
BY James G. Bethell
ATTORNEY

Patented Apr. 7, 1953

2,633,603

UNITED STATES PATENT OFFICE 2,633,603

MOLD

Hiram N. Huse, North Scituate, R. I.

Application June 28, 1950, Serial No. 170,878

2 Claims. (Cl. 18—42)

This invention relates to an improvement in molds for use in molding plastic articles, such as articles of rubber, natural and synthetic, nylon, and other compounded non-metallic materials.

One of the objects of my invention is to provide a mold which is of such construction that considerable expense is eliminated incident to machining the mold faces extremely accurately and in order to eliminate flash of the molded article.

Another object of my invention is to provide a mold a part of which employs a plastic resilient material to obtain perfect mating where mold parts separate and eliminate flash overflow at such separations from contact with the article being molded.

A further object of the invention is to provide a mold construction for molding plastics by any of the conventional methods, namely, press molding, injection molding, etc., wherein I provide plastic mold inserts which form the mold cavity. These inserts in whole or in part can be replaceable and repeatedly made very inexpensively and with extreme accuracy by casting from a matrix, for example.

More specifically, my invention provides a mold which in part is of plastic material that will be sufficiently elastic to self-align its overflow escape surfaces immediately surrounding the article being molded, the plastic maintaining such surfaces tightly compressed and after the initial surge and escape of superfluous overflow material sealing the molded article so as to prevent separation or leaks around the overflow seam. This will entirely pinch off the overflow from the molded article during the molding process to eliminate flash, which frequently is the cause of cracks, leakage, and separation, and eliminate the expense incident to subsequent trimming and buffing away of overflow at the seam of the article.

Fig. 1 of the accompanying drawing shows in sectional elevation a mold of my improved construction;

Figure 1:
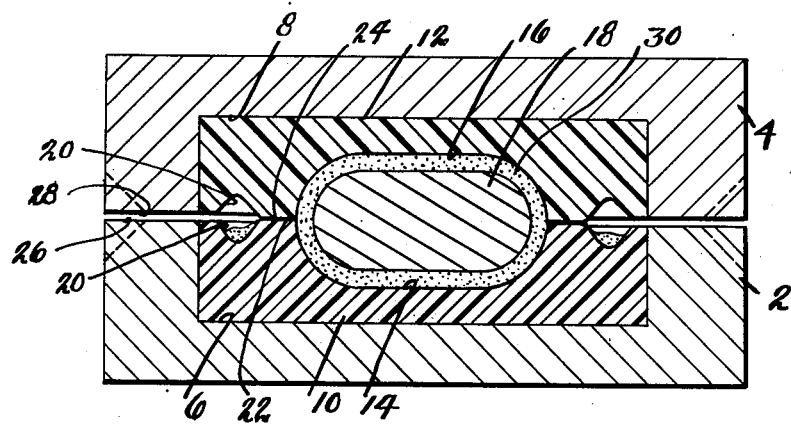
Figure 2:
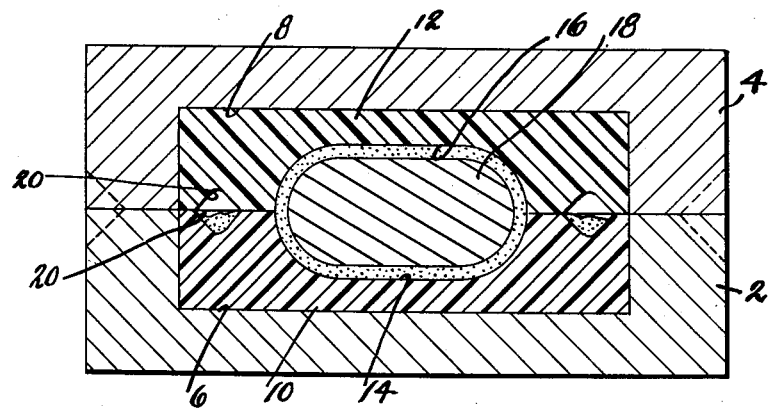
Fig. 2 is a view similar to Fig. 1, showing the mold in closed position.

Referring to the drawings in detail and first to Figs. 1 and 2:

My improved mold comprises the fixed metal lower section or base 2 and the movable metal upper section 4 of a mold of the press type.

The inner face of the lower section or base 2 is provided with a depression 6, while the metal upper section 4 is provided with a depression 8.

Forced or molded into the depression 6 of the mold base, so as to be frictionally held therein or fastened in this depression in any suitable fashion, is a plastic insert 10, which is to constitute one portion of the mold cavity, while similarly mounted in the depression 8 of the upper section 4 of the mold is a plastic insert 12, which is to constitute the remaining portion of the mold cavity.

The inner face of the plastic cavity insert 10 is provided with a depression 14, while the inner face of the plastic cavity insert 12 is provided with a depression 16, the two depressions constituting the cavity of the mold, as will be understood.

18 designates the mold core, and it may be of metal or other suitable material, and it may be supported in conventional fashion.

The mold described is for molding hollow objects, such as hot water bottles, bulbs, bathing caps, etc. When solid objects, as distinguished from hollow objects, are to be molded, then, of course, the core 18 is omitted.

Each of the plastic cavity inserts 10 and 12 is provided in its inner face with an annular groove 20. Each of these grooves surrounds the cavity in the corresponding insert, and the grooves are so positioned as to register with each other to form an overflow groove for the reception of overflow excess stock during the molding operation.

As will be seen from Fig. 1, the plastic cavity inserts 10 and 12 are so proportioned that the surfaces 22 and 24 of the cavity inserts lying between the overflow grooves 20 and the mold cavities 14 and 16 will contact each other as the mold is being closed before the faces 26 and 28 of the metal mold sections 2 and 4 contact each other and before full pressure is applied to the mold surfaces.

In Fig. 1 the mold has been illustrated in partially closed position, and it will be seen that the metal sections of the mold are separated, although surfaces 22 and 24 of the cavity inserts have contacted.

It will be apparent from the foregoing that, in closing the mold, excess overflow from the stock 30 being molded is free initially to escape to the overflow provided by the annular grooves 20 in the faces of the plastic cavity inserts.

As the surfaces 22 and 24 of the plastic cavity inserts engage each other before full pressure is approached, the material of the inserts at the areas 22 and 24 will be displaced in the direction of the overflow groove, and, as pressure is increased further to close the mold until the metal surfaces 26 and 28 are in contact, such increased pressure will, at surfaces 22 and 24, pinch off, separate, and seal the article being molded from the overflow and from any outside atmosphere or pressure. At suitable points and under certain conditions it may be desirable to provide vent holes to relieve excessive pressures that may accumulate within the stock being molded.

Of course, the pressure on the molds is continued until the surfaces 26 and 28 of the metal mold sections 2 and 4 engage and further mold compression is prevented.

As above pointed out, Fig. 2 illustrates the mold in fully closed position, and it will be seen that the overflow from the mold cavity has been pinched off, so that the exterior of the molded article is devoid of flash, thus eliminating the expense incident to removing the flash and buffing, common in the molding field today.

Figure 3:
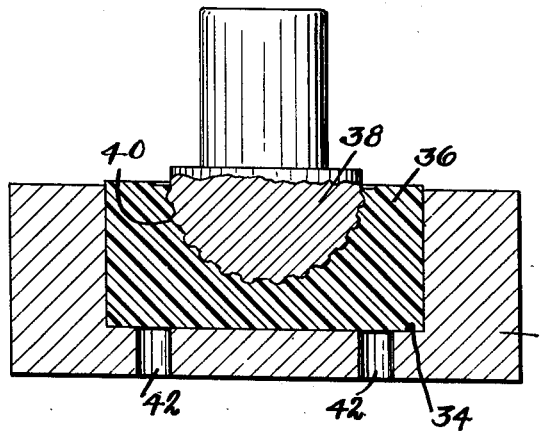
Figs. 3 and 4 illustrate in part section an assembled apparatus suitable for making the inserts for my improved mold.
Figure 4:
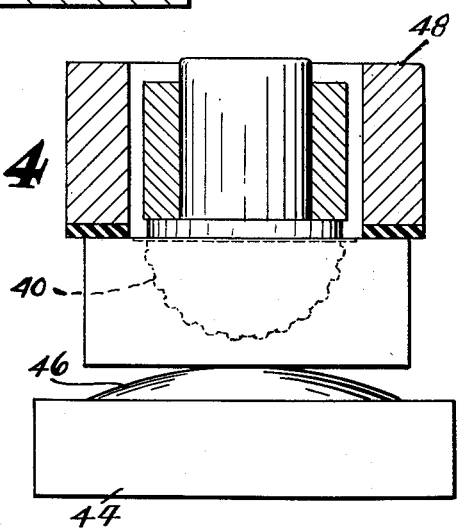

The plastic inserts 10 and 12 may be made in many ways, but, for purposes of illustration, I have shown, in Figs. 3 and 4, equipment for making plastic inserts for molding golf ball cups or cover halves in which finished golf balls can be molded.

Referring to Figs. 3 and 4, 32 designates a metal backing plate provided with cavity 34. The plastic 36, which is to be formed into a plastic insert, is molded into this cavity, during which time a metal plug 38 is held in a fixed position in the plastic 36 to form the negative inside surface of the plastic insert. The surface of the plug will be provided with projections 40, which are to form cavities or depressions in the plastic 36 for conventional surface marking of a golf ball cover half or cup to be molded in the finished plastic mold insert.

After this step of the procedure has been completed, the plastic 36 with the plug 38 in place may be pushed from the backing plate 32 by inserting pushing rods through holes 42 provided in the bottom of the plate.

The assembly of plastic 36 and plug 38 may then be placed on a fixture 44. The top of the fixture is dome-shaped, as shown at 46, and, by applying pressure to pressure ring 48, the plastic will be spread so as to permit the plug 36 to be lifted out of the plastic without mutilating the plastic undercut impressions negative to the metal projections on the plug 38.

The insert is now complete and ready to be placed in a mold.

It will be appreciated that in the manufacture of plastic mold inserts for some objects, as, for example, a half cup the outer surface of which is smooth, the fixture of Fig. 4 may not be necessary.

It will be apparent that the plastic inserts of this invention are not only inexpensive but, inasmuch as the metal sections 2 and 4 in which the plastic inserts are set limit the pressure on the plastic regardless of the mold pressure employed, the inserts are not permanently distorted and may be used over and over again.

It is to be noted that the plastic 36 being molded in my improved mold is in effect incompressible; nevertheless, the further closing of the mold, above referred to, after surfaces 22 and 24 of the plastic inserts have contacted each other, appears to further compress the minute cells within the molding material to produce a denser and more tightly compressed molded article than produced in conventional molds, where the overflow is not separated and sealed from the article being molded.

It is to be understood that the plastic selected for the mold cavity inserts will depend upon the type of plastic which is to be molded and the mold pressure and curing temperatures to be employed. In other words, the plastic selected should have a softening temperature higher than the temperatures encountered in the molding operation. For example, nylon could be employed for the cavity inserts where rubber is the plastic to be molded. Of course, some rubber articles are acid-cured, in which case temperatures encountered present no problem.

Figure 5:
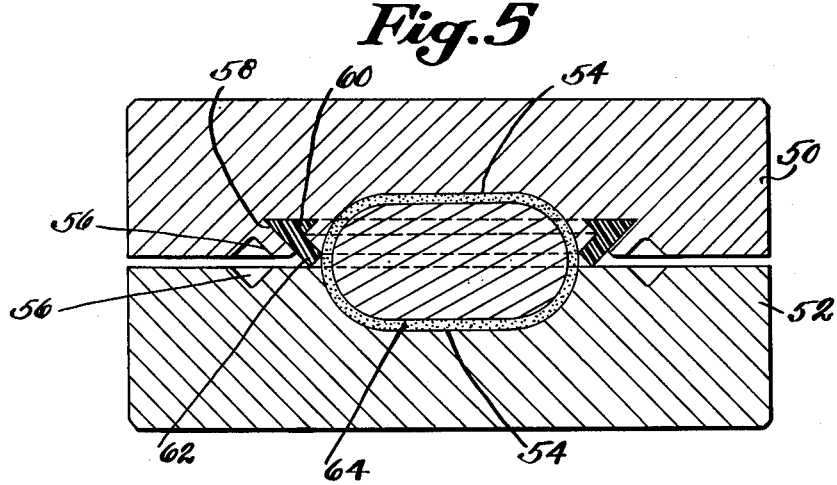
Fig. 5 is a sectional elevational view of another embodiment of my invention.
Figure 6:
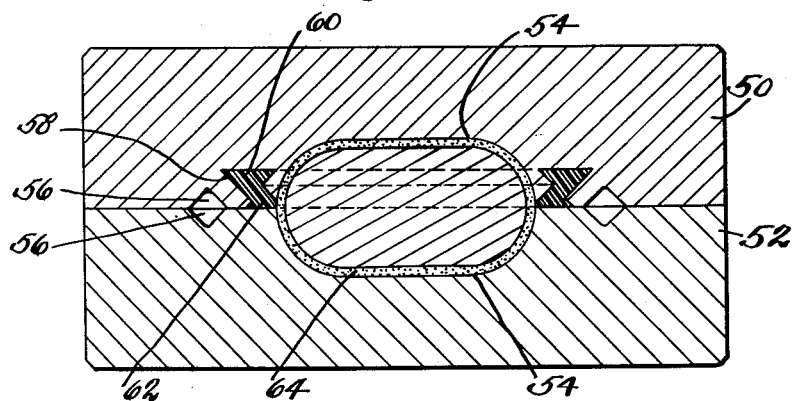
Fig. 6 is a view similar to Fig. 5, showing the mold fully closed.

In the modification illustrated in Figs. 5 and 6, I have provided a construction by which existing molds may be altered so as to utilize some of the advantages of my invention.

Referring to this embodiment of my invention, 50 and 52 designate the upper and lower halves, respectively, of a steel or other metal mold.

The mold halves are provided with the usual mold cavity 54. The mold halves are provided also with overflow grooves 56. These are annular grooves in the face of each mold half and are spaced a short distance from the mold cavity.

Between the overflow grooves 56 and the mold cavity, the mold half 50 is provided with an undercut slot 58 and cast into this slot is an annular plastic insert 60. This insert projects slightly from the face of the mold half 50, as illustrated at 62, at the edge of the mold cavity.

The function of the insert 60 is to pinch and seal off the flash during molding.

It will be seen from Fig. 5 that, at the very beginning of the molding operation after the plastic 64 being molded has been charged into the mold, the plastic annulus 60 starts to seal off the mold at the cavity separation, and, as the mold halves are gradually closed to full molding position, as illustrated in Fig. 6, the insert 60 is displaced and deformed to close the space at and between the mold separations to seal the article being molded and pinch off and separate its overflow therefrom. In other words, as in the embodiment of my invention previously described, the plastic insert will pinch and seal off the flash during molding, thus eliminating flash and the expense incident to subsequent trimming and buffing away of overflow at the seam of the article being molded.

It is to be noted that, while the plastic insert 60 has been described as provided in the upper mold half 50, it may be placed instead in the lower half, and it is within the comprehension of my invention to provide such an insert in each mold half.

It is to be understood that changes may be made in the details of construction and arrangement of parts hereinabove described within the purview of my invention.

What I claim is:

1. A mold for molding plastic articles, said mold comprising, in combination, a pair of opposed metal backing plates movable to bring their opposed faces into contact with each other to close the mold; a resilient, plastic insert set into the inner face of each backing plate, the opposed faces of said inserts being shaped to provide a mold cavity; an annular overflow groove in the inner face of each of said inserts, said grooves being disposed abreast of each other and spaced laterally from the mold cavity to provide for the reception of plastic overflowing from the mold cavity and escaping between the faces of the inserts, the inner faces of the inserts at the areas lying between the said grooves and the mold cavity extending out of the plane of the inner faces of the backing plates, whereby the overflow from the mold cavity will be pinched off at the cavity and the cavity sealed prior to full contact of the inner faces of the backing plates.

2. A mold for molding plastic articles, said mold comprising, in combination, a pair of opposed metal backing plates provided with flat opposed surfaces adapted to be moved into contact with each other under full mold pressure to close the mold; a resilient, plastic insert set into the inner face of each backing plate, the periphery of each insert terminating a substantial distance short of the peripheries of said backing plates, the opposed faces of said inserts being shaped to provide a mold cavity; an annular groove in the inner face of each insert, said grooves being positioned intermediate the mold cavity and the periphery of the inserts and so disposed relatively as to register with each other when the mold is closed, that portion of the face of the inserts lying between the said grooves and the mold cavity projecting inwardly of the mold beyond the plane of said flat opposed surfaces of the backing plates, whereby, in closing the mold, said portions of the faces of the inserts will engage each other and be compressed to pinch off any overflow from the mold cavity and seal the cavity prior to full contact of said flat opposed surfaces of the backing plates and complete closure of the mold.

HIRAM N. HUSE.

REFERENCES CITED

The following references are of record in the file of this patent:

UNITED STATES PATENTS

| Number | Name | Date |
|---|---|---|
| 1,527,206 | Marquette | Feb. 24, 1925 |
| 2,148,079 | Martin | Feb. 21, 1939 |
| 2,368,327 | Rose | Jan. 30, 1945 |

FOREIGN PATENTS

| Number | Country | Date |
|---|---|---|
| 605,978 | Great Britain | Aug. 4, 1948 |